US00RE50845E

(19) United States
(12) Reissued Patent
De La Serna Gonzalez et al.

(10) Patent Number: US RE50,845 E
(45) **Date of Reissued Patent: *Mar. 31, 2026**

(54) ELECTRIC MOTOR DEVICE FOR PEDAL ASSIST BICYCLES

(71) Applicant: MAHLE International GmbH, Stuttgart (DE)

(72) Inventors: Marco Antonio De La Serna Gonzalez, Palencia (ES); Jose Vicente Franco Revilla, Palencia (ES); Jose Joaquin Cortes Lopez, Palencia (ES)

(73) Assignee: Mahle International GmbH (DE)

( * ) Notice: This patent is subject to a terminal disclaimer.

(21) Appl. No.: 18/514,629

(22) Filed: Nov. 20, 2023

Related U.S. Patent Documents

Reissue of:
(64) Patent No.: 11,396,346
Issued: Jul. 26, 2022
Appl. No.: 16/640,396
PCT Filed: Aug. 23, 2018
PCT No.: PCT/ES2018/070569
§ 371 (c)(1),
(2) Date: Feb. 20, 2020
PCT Pub. No.: WO2019/038463
PCT Pub. Date: Feb. 28, 2019

(30) Foreign Application Priority Data

Aug. 24, 2017 (ES) ..... 201730985U

(51) Int. Cl.
*B62J 6/16* (2020.01)
*B62J 11/19* (2020.01)
(Continued)

(52) U.S. Cl.
CPC ..... *B62M 6/90* (2013.01); *B62J 6/16* (2013.01); *B62J 11/19* (2020.02); *B62M 6/50* (2013.01);
(Continued)

(58) Field of Classification Search
CPC ..... B62J 43/13; B62J 43/28; B62M 6/90; H01M 50/298
See application file for complete search history.

(56) References Cited

U.S. PATENT DOCUMENTS 7,080,848 B2 * 7/2006 Hara ..... B62K 21/12 280/288.4
8,459,682 B2 * 6/2013 Calfee ..... B62J 43/28 280/281.1
(Continued)

FOREIGN PATENT DOCUMENTS

DE 102015012734 A1 * 4/2016 ..... B62K 19/30
EP 1010612 A1 6/2000
(Continued)

OTHER PUBLICATIONS

English machine translation of IT-MI913315-A1 (Zukin) (Year: 1993).*
(Continued)

*Primary Examiner* — Laura Davison
(74) *Attorney, Agent, or Firm* — Fishman Stewart PLLC

(57) ABSTRACT

An electric motor device for pedal assist bicycles may include an electric motor connectable to a rear wheel rim of a bicycle, a pedaling sensor connectable to a hanger of a frame of the bicycle, a charging outlet, a control unit, and a block insertable into an oblique main tube of the frame. The electric motor may include at least one free wheel rigidly connectable to transmission gear wheels of the bicycle. The block may include a battery configured to actuate the electric motor, a motor controller configured to control a plurality of operating parameters of the electric motor, a battery manager configured to manage the battery connected in parallel to the battery and to the motor controller, a plurality of first cables connecting the block to the electric motor, the charg-
(Continued)

Amended ing outlet, and the pedaling sensor, and a plurality of second cables connecting the block to the control unit.

21 Claims, 10 Drawing Sheets

(51) Int. Cl.

| | |
|---|---|
| ***B62K 19/40*** | (2006.01) |
| ***B62M 6/50*** | (2010.01) |
| ***B62M 6/60*** | (2010.01) |
| ***B62M 6/90*** | (2010.01) |
| *B62K 3/04* | (2006.01) |

(52) U.S. Cl.
CPC ..... *B62M 6/60* (2013.01); *B62K 3/04* (2013.01); *B62K 19/40* (2013.01)

(56) References Cited

U.S. PATENT DOCUMENTS

| | | | | |
|---|---|---|---|---|
| 8,979,111 | B2 * | 3/2015 | Dal Pozzo | B62J 50/225 180/68.5 |
| 9,221,516 | B1 * | 12/2015 | Song | B62M 11/16 |
| 9,611,002 | B1 | 4/2017 | Shum et al. | |
| 9,669,896 | B2 * | 6/2017 | Zhao | B62M 6/65 |
| 11,021,212 | B2 * | 6/2021 | Shimoda | B62J 43/28 |
| 11,088,525 | B2 * | 8/2021 | Nakamura | H01M 50/262 |
| 2005/0029033 | A1 * | 2/2005 | Rip | B62M 9/16 180/220 |
| 2005/0126840 | A1 * | 6/2005 | Lin | B62M 6/90 180/207.3 |
| 2013/0118825 | A1 * | 5/2013 | Kwag | H01M 50/20 180/220 |
| 2013/0241169 | A1 * | 9/2013 | Talavasek | B62K 19/30 280/274 |
| 2013/0241174 | A1 * | 9/2013 | Meyer | B62K 25/30 280/281.1 |
| 2014/0370354 | A1 * | 12/2014 | Yang | H01M 10/659 429/120 |
| 2015/0298758 | A1 * | 10/2015 | Strien | B62K 21/18 280/279 |
| 2017/0073042 | A1 * | 3/2017 | Evensen | B62K 19/40 |
| 2017/0152000 | A1 * | 6/2017 | Chien | B62M 6/45 |
| 2017/0207467 | A1 * | 7/2017 | Shelton, IV | H01M 6/5044 |

FOREIGN PATENT DOCUMENTS

| | | | | |
|---|---|---|---|---|
| EP | 3068013 | A1 | 9/2016 | B62M 6/90 |
| IT | MI913315 | A1 * | 6/1993 | |
| WO | 2003/022671 | A2 | 3/2003 | |
| WO | 2011/019743 | A1 | 2/2011 | |
| WO | 2011/035350 | A2 | 3/2011 | |
| WO | WO-2016184613 | A1 * | 11/2016 | B62M 6/55 |

OTHER PUBLICATIONS

English machine translation of WO-2016184613-A1 (Sobig) (Year: 2016).*

Endless Sphere DIY EV Forum, "open source Universal quick swap battery" thread, https://endless-sphere.com/sphere/threads/open-source-universal-quick-swap-battery.65880/, post by user "flathill" on Jan. 7, 2015 (Year: 2015).*

ElectricBike-Blog.com, "The Most Power You'll Ever Be Able to Fit in Your Pocket," Karl Gesslein, https://electricbike-blog.com/2016/05/08/the-most-power-youll-ever-be-able-to-fit-in-your-pocket-6ah-3-3-lb-30q-luna-mighty-mini-cube-pack-reviewed/, May 8, 2016 (Year: 2016).*

Doug Lowe, Electronics Projects: How to Build Series and Parallel Circuits, Sep. 2, 2016, http://web.archive.org/web/20160902234248/http://www.dummies.com:80/programming/electronics/diy-projects/electronics-projects-how-to-build-series-and-parallel-circuits (Year: 2016).* https://www.wattflyer.com/forums/showthread.php?t=72225 kyleservicetech, Redwing MSXR Model Conversion, Oct. 17, 2013, WattFlyer RC Electric Flight Forums (Year: 2013).*

Merriam-Webster, Definition of direct, 2021 (Year: 2021).*

Merrian-Webster, Definition of connected, 2021 (Year: 2021).*

* cited by examiner

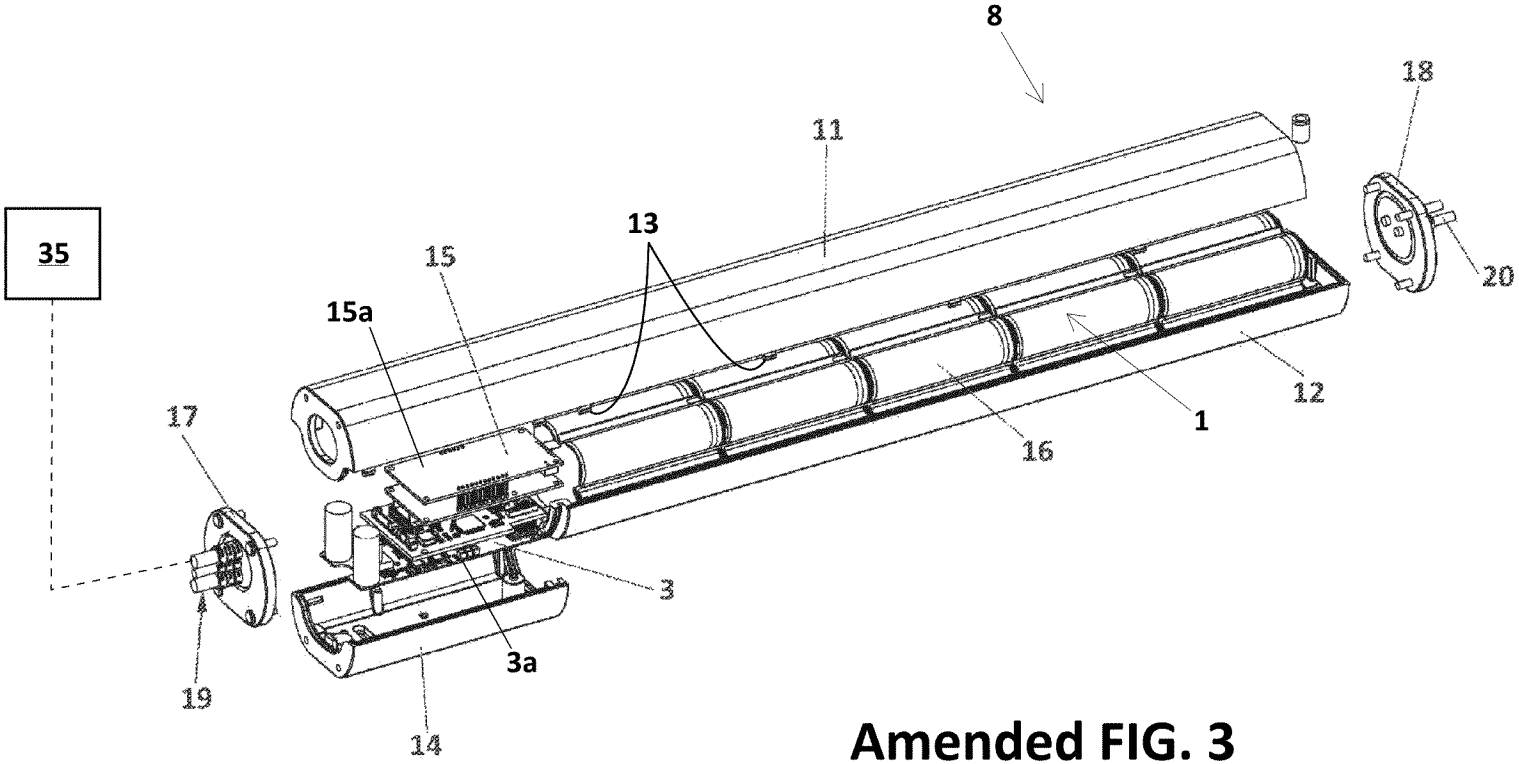
Amended FIG. 3

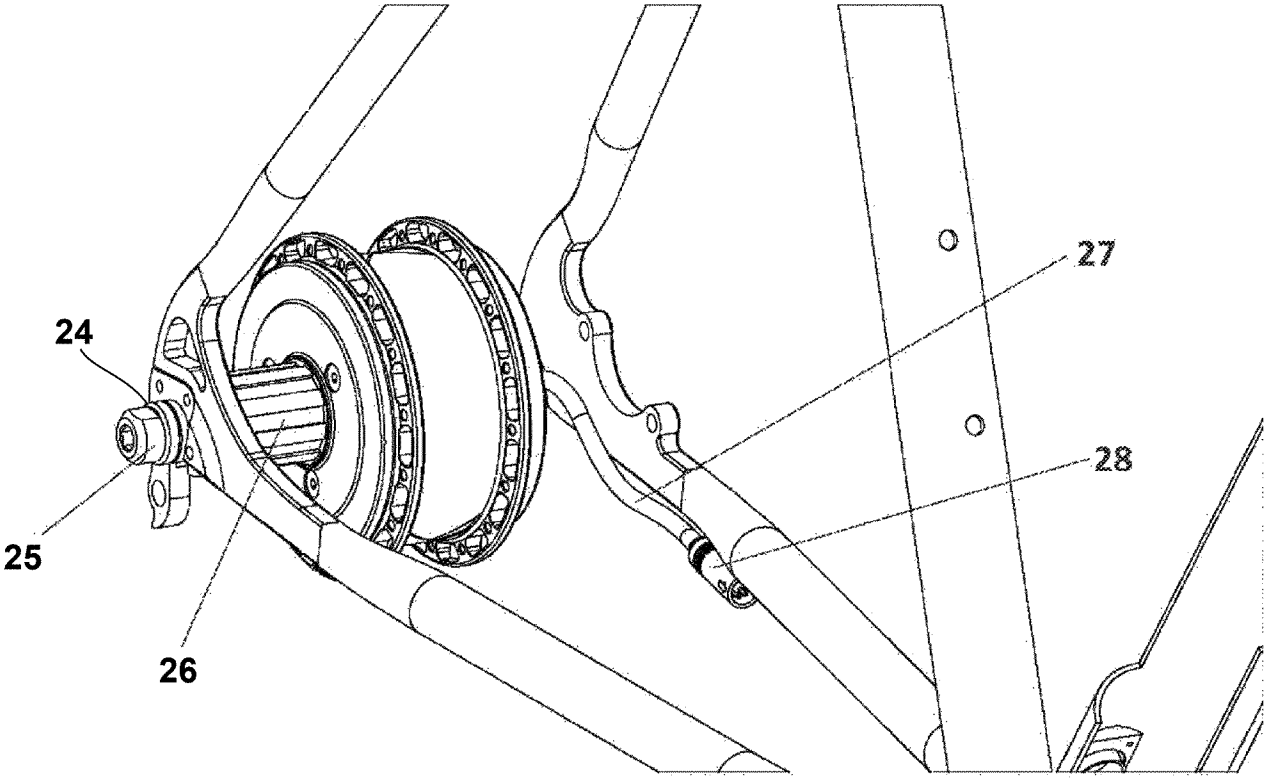
Amended FIG. 5

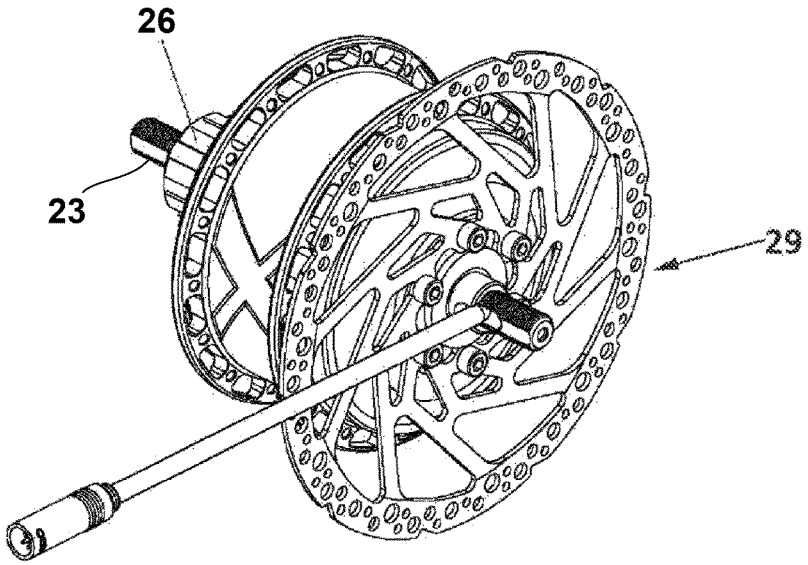
Amended FIG. 6
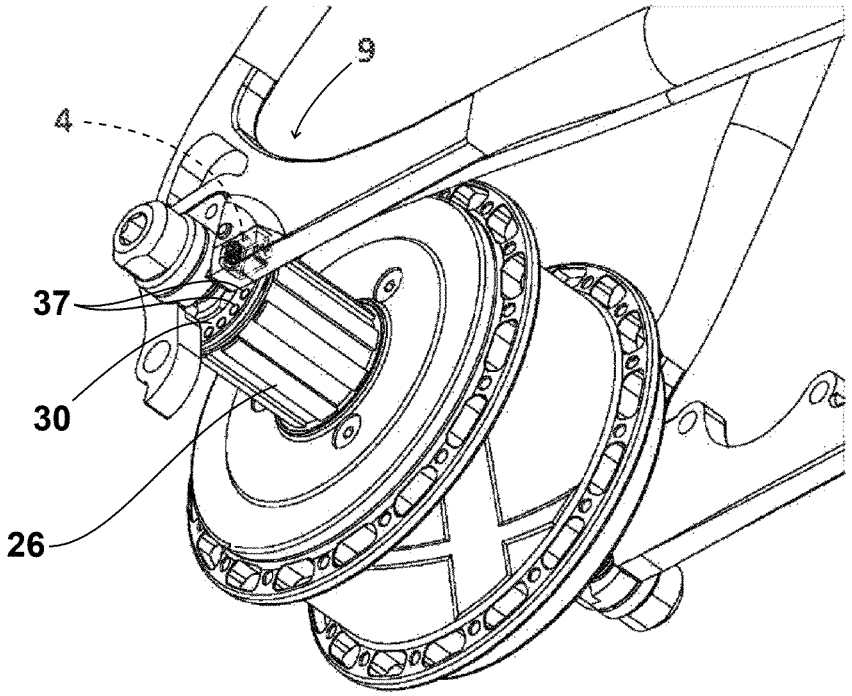
Amended FIG. 7

ELECTRIC MOTOR DEVICE FOR PEDAL ASSIST BICYCLES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a Reissue Application of U.S. patent application Ser. No. 16/640,396 filed Feb. 20, 2020, and issued as U.S. Pat. No. 11,396,346 on Jul. 26, 2022, which* claims priority to International Patent Application No. PCT/ES2018/070569, filed on Aug. 23, 2018, and Spanish Patent Application No. U201730985, filed on Aug. 24, 2017, the contents of both of which are hereby incorporated by reference in their entirety.

TECHNICAL FIELD

The present invention pertains to the technical field of bicycle frames and to the technical field of propulsion batteries for users of wheeled vehicles with an additional energy source, and relates in particular to an electric motor device for pedal assist bicycles in which the battery and control of an electric motor are built into the frame and the electric motor is built into the hub of the rear wheel.

BACKGROUND

The increased use of bicycles in recent years, in particular in urban environments in which journeys tend to be shorter and road-traffic problems more common, has driven the development of bicycle technology.

In the specific case of bicycles fitted with energy sources for assisting pedaling, known generically as electric bicycles, a plurality of bicycle frames especially designed to house removable, rechargeable, interchangeable batteries, which add significant extra weight and make riding more difficult, are known. Furthermore, given that such batteries tend to be designed to be easily removable, impacts and vibration tend to occur, having a negative effect on the service life of the battery.

Moreover, the electric motors commonly used to motorize bicycles tend to have control elements that are located beside or inside the body of the motor. Since said motors are built into the axle of the rear wheel, the motor/controller assembly adds more mass, which also makes riding more difficult. It also increases the rotating mass, and therefore the inertia, of the motor.

SUMMARY

The invention comprises an electric motor device for pedal assist bicycles in which the battery and control of an electric motor are built into the frame and the electric motor is built into the hub of the rear wheel, said device also including additional elements such as a control unit designed to be built into the bicycle frame or into the handlebar, a battery charging outlet, a pedaling sensor designed to be built into the bicycle frame, and a series of elements for controlling assist levels and the state of the bicycle. The main feature of the device is the reduced size of the elements thereof, enabling the device to be integrated with minimal impact on the design, weight or volume of the bicycle, being practically imperceptible.

The battery is designed to be inserted into the main tube of the frame. This element is separate from the frame and can be removed for repair or replacement through an open end of said tube. The battery is small and can be inserted into tubes with a circular section starting at 55 mm in diameter, which is not greater than the diameter of the main tubes usually used in conventional bicycle frames made of aluminum or carbon fiber.

Positioning and rigidly connecting the battery inside the main tube, in which said tube is only open at one end, through which the battery is inserted or removed during the initial installation or manufacturing process, represents an advantage over semi-integrated batteries that can be removed by the user, since the tube of the chassis does not require special strengthening as said tube does not need to be cut, as is commonly the case with this type of battery, resulting in a lighter bicycle frame.

Another advantage is the protection that said frame tube provides to the battery against impacts, since the battery is entirely contained within the tube. Rigidly connecting the battery to the main tube using screws, instead of quick release systems designed to enable the user to remove the battery easily, affords an advantage in terms of protection and service life of the battery, since the fastening is stronger and prevents vibration, which tends to shorten the service life of the battery cells, and the risk of connections coming loose and leaving the batteries unused.

One of the main differences from other battery assembly systems is that the battery is designed to be integrally assembled with the tube such that the battery cannot be removed.

Unlike most electric motors for bicycles, the motor control of the device is positioned in the body of the battery instead of the body of the motor. This helps to reduce the weight and size of the motor, which is advantageous since the motor is built into the axle of the rear wheel, since the weight of the motor control is positioned centrally in the frame, thereby reducing the rotating mass of the motor, and therefore the inertia thereof.

Such positioning of the motor control inside the frame is also advantageous since the motor control is less exposed to impacts, dust, mud and water. The physical separation of the motor and the controller is also very advantageous in terms of discharging the heat generated by both elements, on account of the electrical current passing between said elements. Since the motor control is rigidly connected to and in contact with the frame of the bicycle, which is usually made of aluminum, the motor control has the entire surface of the frame to discharge and dissipate the heat generated, instead of conveying said heat to the body of the motor, which also generates heat.

The battery management system (BMS) is an electronic system that manages a rechargeable battery and whose main function is to prevent the battery from operating outside the safe zone thereof, thereby preventing overcharging or discharging beneath the limits thereof. This system is usually positioned together with the packet of cells forming the battery, and is connected using cables outside the motor control.

In the device to which the invention relates, since the motor control is built into the body of the battery, the circuit boards of the BMS and motor control are connected in parallel, and the connections are made directly and not using cables, which makes the system more compact and less liable to faults caused by external connection cables, and less loss of electrical energy caused by heat, since said external cables are not required.

Both the motor control and the BMS are designed as a single block, both physically and electronically, such that the two are indivisible and cannot work separately. Consequently, the power electronics are balanced between the motor control and the BMS, sharing functions and thereby reducing the weight.

The battery can have a cell layout based on the inclusion of one auxiliary cell for each group of 10 or 13 cells, making a layout of 10+1 cells or 13+1 cells, generating 11S2P layouts (11 batteries in series and 2 groups in parallel) instead of 10S2P, or 14S2P instead of 13S2P.

This layout enables a special BMS to regulate the maximum voltage supplied to the motor in 36 and 48 V layouts, ensuring that the maximum voltage supplied by the BMS never exceeds the maximum threshold permitted by the motor, providing a battery that works at a higher voltage in the maximum discharge zone thereof, and providing more power when the battery is almost empty.

The main battery can be used in combination with a removable auxiliary battery that can be positioned in the external zone of the bicycle. This battery can be used jointly with the main battery in two ways: either by simulating a charger or by switching the energy supply between the two batteries automatically. Thus, each time an external battery is connected, the entire charge of the battery is used until the battery is completely empty, and the system automatically switches to the internal battery once the auxiliary battery is empty.

One of the main elements of an electrical motor system for pedal assist bicycles is a pedaling sensor, since, by law, motor control is only activated in this type of bicycle if the user is pedaling. The pedaling sensor is normally located in the bottom-bracket axle of the bicycle, since rotation of this axle means that the user is pedaling, and the motor is activated. The major drawback of this position of the sensor is that it requires the use of a specific bottom-bracket axle, which is usually heavier and more expensive than those available on the market, as well as determining the use of systems with hollow axles, which are standard in mid-range and high-end bicycles.

The device to which the invention relates has a pedaling sensor located in the free wheel of the hub of the rear wheel, where the motor is installed. The free wheel of the hub only rotates when the rear sprocket wheel (in the case of one-speed bicycles) or cassette (in the case of multi-speed bicycles) is rotating under traction by the chain from the front sprocket wheel. Consequently, if the free wheel is rotating then the user is pedaling, and the pedaling sensor sends a signal to the motor control to activate the motor. In this case, a specially shaped magnetized nut is used to provide exact readings of the movement of the free wheel, identifying movement in both directions in the fastening zone of the cassette to the free wheel.

Finally, the control interface includes a series of elements relating to control thereof and to the user interface. In this case, the actuation system can include either a three-button remote control or a single-button remote control. In both cases, the remotes include a light that is preferably RGB. This light can be designed to inform the user both of the assist level and of the state of the battery or any other information generated by the system or elements connected thereto, such as mobile applications or telephone calls.

The operating mechanism enables a single RGB LED light to provide information on several different functions at once (batteries and assistance), using constant or flashing lights for this purpose. In the case of a three-button remote control, a vibration motor is incorporated therein.

The vibration motor, which is similar to the motor in a mobile telephone, is designed to vibrate to confirm to the user that a button has been pressed, augmenting the pushing feeling and feedback from the operation. Moreover, the button can also vibrate in different ways and at different frequencies to provide the user with information on other types of notification, such as third-party events, outages, reaching specific situations or navigation warnings. This enables the user to be prompted to look at the screen or the rest of the information elements of the human interface that would otherwise be impossible to detect, since the user would need to be looking at said human interface at the time of notification.

BRIEF DESCRIPTION OF THE DRAWINGS

To complement the description provided and to promote a better understanding of the features of the invention, according to a preferred example of a practical embodiment of same, an illustrative and non-limiting set of figures is included as an integral part of said description, in which the following is shown:

FIG. 3 is an exploded perspective view of the block shown in FIG. 2.

FIG. 5 is a bottom perspective view of the motor of the device installed in the frame of the bicycle.

FIG. 6 is a top perspective view of a disk brake coupled to the motor.

FIG. 7 shows the pedaling sensor of the device.

DETAILED DESCRIPTION

A detailed explanation of an example preferred embodiment of the subject matter of the present invention is given below with reference to the aforementioned figures.

Figure 1:
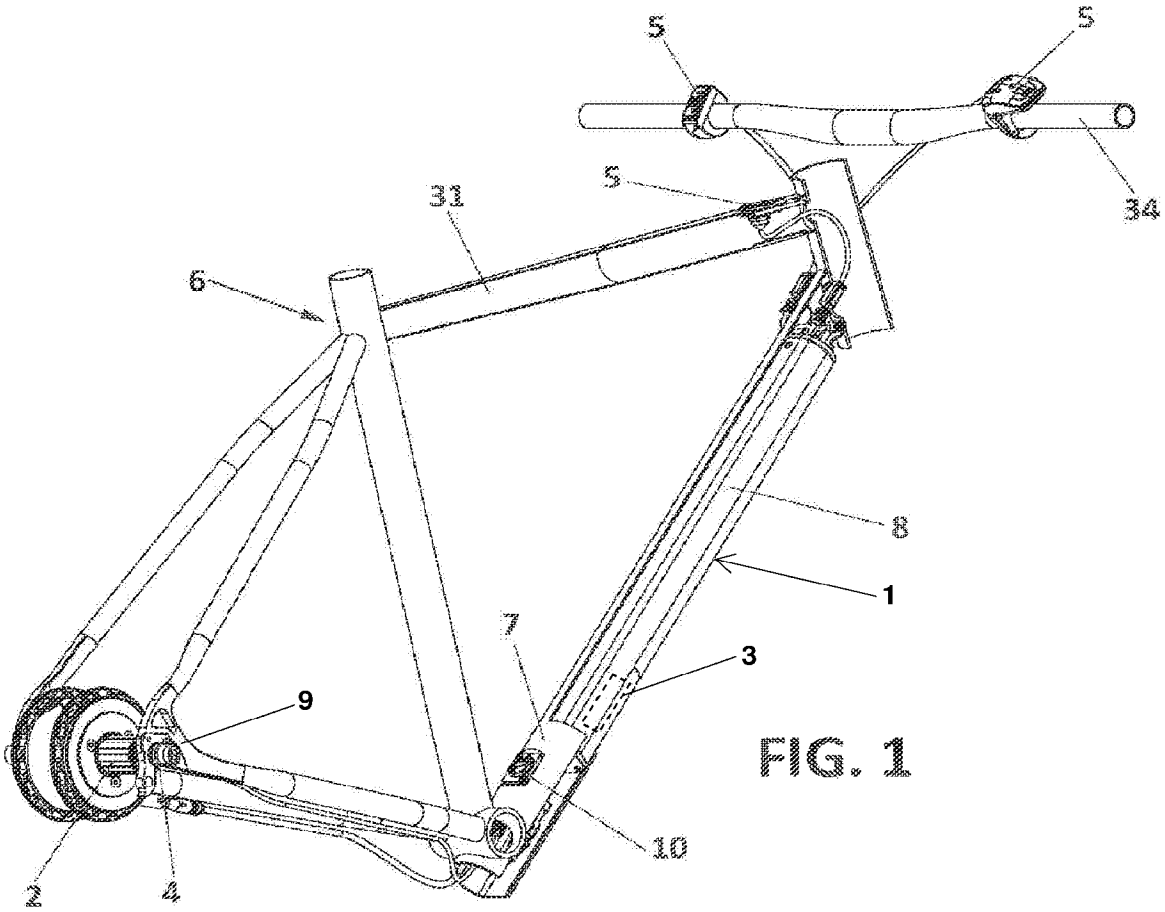
FIG. 1 is a perspective view, with a partial cut-away, of the device installed in the frame of a bicycle, showing the main component elements thereof.

The electric motor device for pedal assist bicycles described and shown in FIG. 1 comprises a rechargeable battery (1), a motor (2) actuated by the battery (1), a motor controller (3) linked to the battery (1), a pedaling sensor (4) and a control unit (5) that can be operated by a user to actuate and control the device.

FIG. 1 shows the frame (6) of a bicycle that has an oblique main tube (7), with a partial cut-away to show the inside thereof. The battery (1) and the motor controller (3) are linked together to form a single block (8) that can be inserted into the main tube (7) through an open lower end.

The motor (2) is also linked to the hub of the rear wheel of the bicycle, and the pedaling sensor (4) is built into the anchoring zone of the rear hub to the frame (6) of the bicycle, known as the hanger (9). Finally, the charging outlet (10) for recharging the battery (1) is positioned in the main tube (7) beneath the battery (1).

Figure 2:
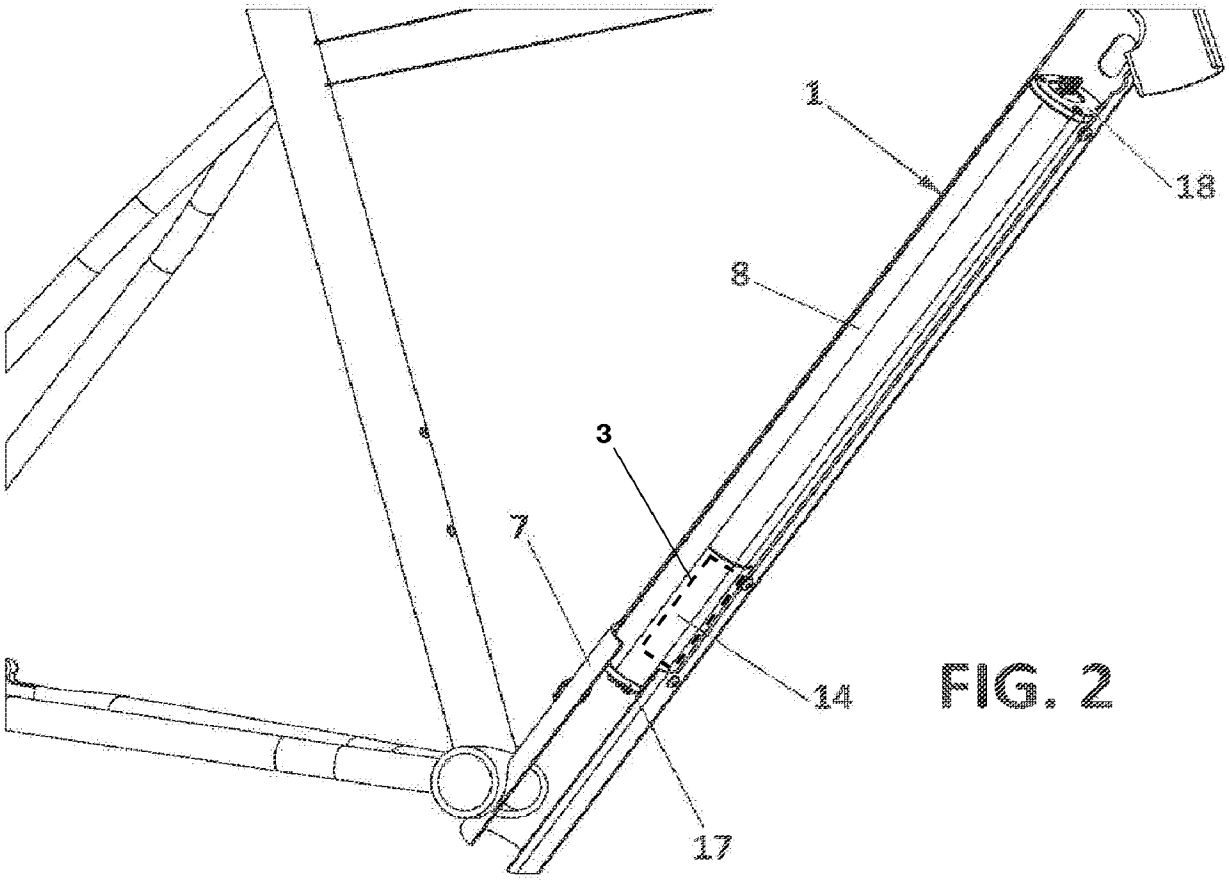
FIG. 2 is a detailed view of FIG. 1, with the main tube of the frame partially cut away to show the block formed by the battery and the controller of the motor of the system to which the invention relates.

FIG. 2 is a detailed view of FIG. 1 showing the block (8) formed by joining the battery (1) and the motor controller (3), which is attached inside the main tube (7) of the frame (6) using screws. In the preferred embodiment shown here, said screws pass through the main tube (7) and are screwed to the block (8).

FIG. 3 is an exploded view of the block (8) formed by the battery (1) and the motor controller (3). Said block (8) has a plastic outer protective covering comprising an upper casing (11) that can be press fitted to a lower casing (12) using a series of tabs (13) distributed about the perimeter edge thereof. Rubbery plastic supports positioned on the outside of the protective covering are used to ensure that the block (8) is well seated inside the main tube (7), regardless of the shape of the section thereof.

One of the lower ends of the block (8) includes a metal seat (14) designed to house the electronic components of the motor controller (3), such as a circuit board (3a). A battery manager (15), which may include a circuit board (15a), arranged above said electronic components is designed to manage the rechargeable battery (1) to ensure that the battery (1) never operates outside the safety ranges thereof, thereby preventing overcharging or discharging beneath the limits thereof. For this purpose, the battery manager (15) is connected to a block of cells (16) that are joined together to form the battery (1). The battery (1) can be used in combination with a removable auxiliary battery (35) that can be positioned in the external zone of the bicycle.

A first cover (17) and a second cover (18), each with respective insulators, are used to close the ends of the block (8). First cables (19) run from the block (8) through the first cover (17) to the end where the motor controller (3) is arranged, and include a cable for connection to the motor (3), a cable for connection to the charging outlet (10) and a cable for connection to the pedaling sensor (4). Second cables (20) run from the block (8) through the second cover (18) to the end where the battery (1) is arranged, and include a cable for connection to the control unit (5) and a cable for auxiliary connections, such as lights or an auxiliary current output.

Integrating the block (8), the battery (1), the motor controller (3) and the battery manager (15), which are connected directly together in parallel without using cables, provides a device that is more compact and less liable to faults caused by external connection cables, and lower losses of electrical energy caused by heat.

Figure 4A:
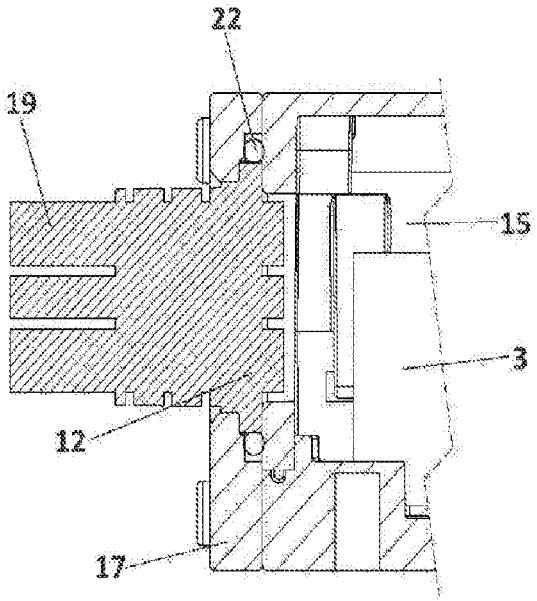
FIG. 4A is a side view of a longitudinal cross section of one of the closures of the block.
Figure 4B:
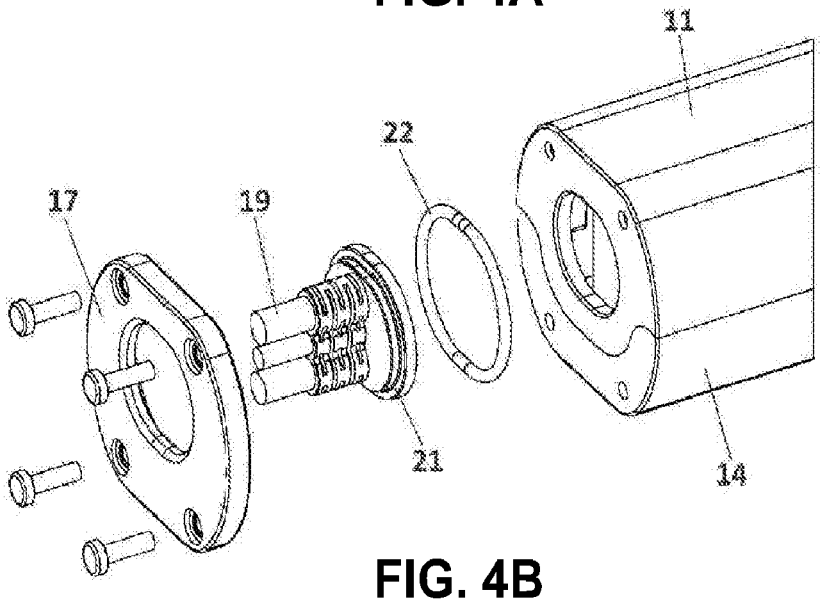
FIG. 4B is an exploded perspective view of the closure of the block.

FIGS. 4A and 4B are detailed views of the first rigid plastic cover (17), which is fastened using screws to the covering, fastening a rubber insulator (21) and press-fitting an O-ring seal (22), also made of rubber, to seal the block (8). The body of the insulator (21) is overmolded onto the first cables (19) to sealingly join said cables together.

FIG. 5 shows the elements that form the electric motor (2), which is hub-shaped and designed to be fastened to the rim of the rear wheel using spokes. The motor (2) has an axle (23) that is designed to be inserted in the hanger (9) of the frame (6), and said axle (23) is prevented from rotating by lock washers (24) and fastened to the frame (6) using nuts (25). A free wheel (26) enables attachments of either a single sprocket wheel, in the case of single-speed bicycles, or a cassette, in the case of bicycles with gears. The motor (2) is connected to the block (8) by a power cable (27) ending in a sealed connector (28).

FIG. 6 shows a disk brake (29) coupled to the motor (2) using a plurality of screws passing through the disk of the brake (29) and screwed to the body of the motor (2).

FIG. 7 shows the elements that make up the pedaling sensor (4), which is inserted into the hanger (9) and fastened using a grub screw. A disk (30) provided with a plurality of magnets (*37*) is fastened to the free wheel (26) of the motor (2) such that the combined rotation of the disk (30) and the free wheel (26) caused by the user pedaling activates the pedaling sensor (4).

Figure 8:
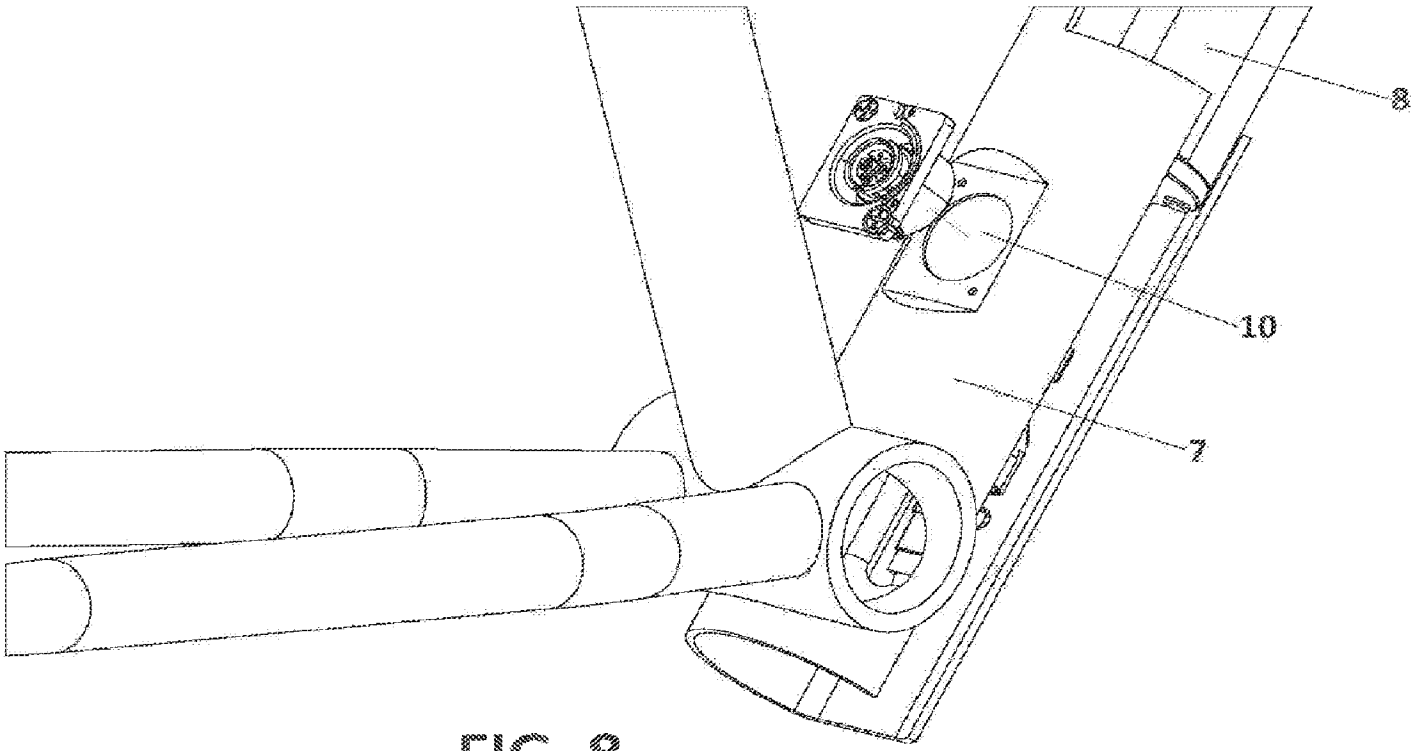
FIG. 8 is a detailed exploded perspective view of the charging outlet.

FIG. 8 shows the charging outlet (10) for recharging the battery (1), which is inserted into the main tube (7) of the frame (6) using screws and includes a protective stopper.

Figure 9:
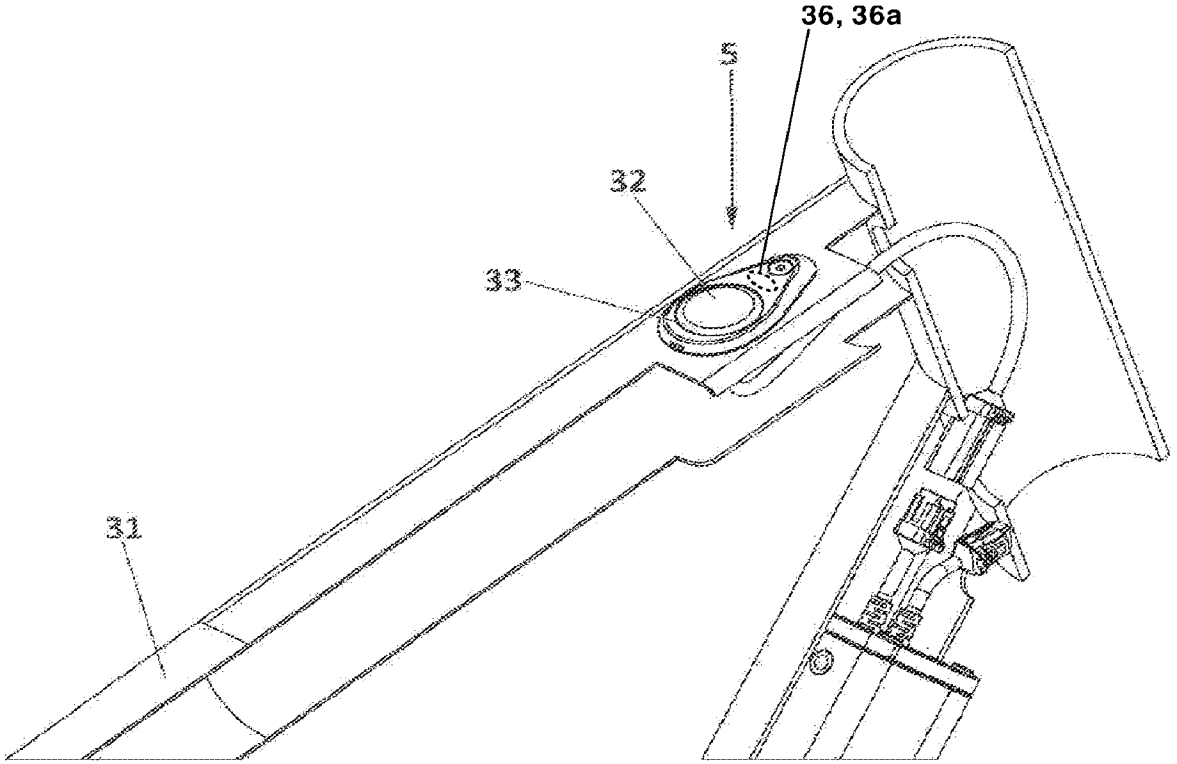
FIG. 9 is a detailed view of the control unit according to a first preferred embodiment.

FIG. 9 shows the control unit (5) according to a first preferred embodiment. Said control unit (5), which is fastened to the top tube (31) of the frame (6) of the bicycle and connected to the block (8) by a cable ending in a sealed connector, includes a pushbutton (32) that is provided with a single actuating button mounted on a plastic casing.

The pushbutton (32) is provided with lighting means (33), which in this case is a ring arranged concentrically about the pushbutton (32) with a plurality of LED lights, which change color or light intensity to display information to the user. A vibration motor (36), which may include a variable-frequency drive (36a), can also be included to confirm to the user that the button has been pressed, by vibrating.

Figure 10:
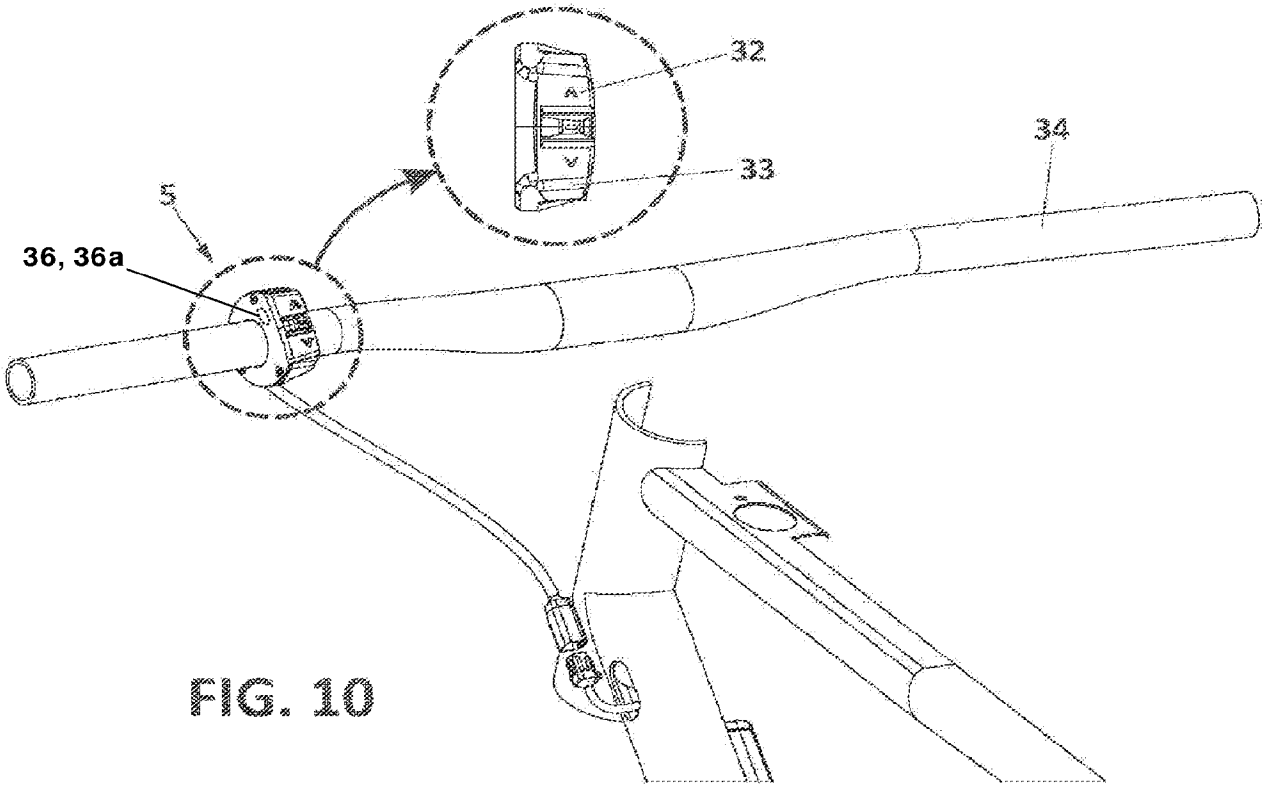
FIG. 10 is a detailed view of the control unit according to a second preferred embodiment.

FIG. 10 shows the control unit (5) according to a second preferred embodiment that includes a three-button pushbutton (32) coupled to the handlebar (34) of the bicycle using a clamp and screw system, that also has the lighting means (33) and the vibration motor (36, 36a).

Figure 11:
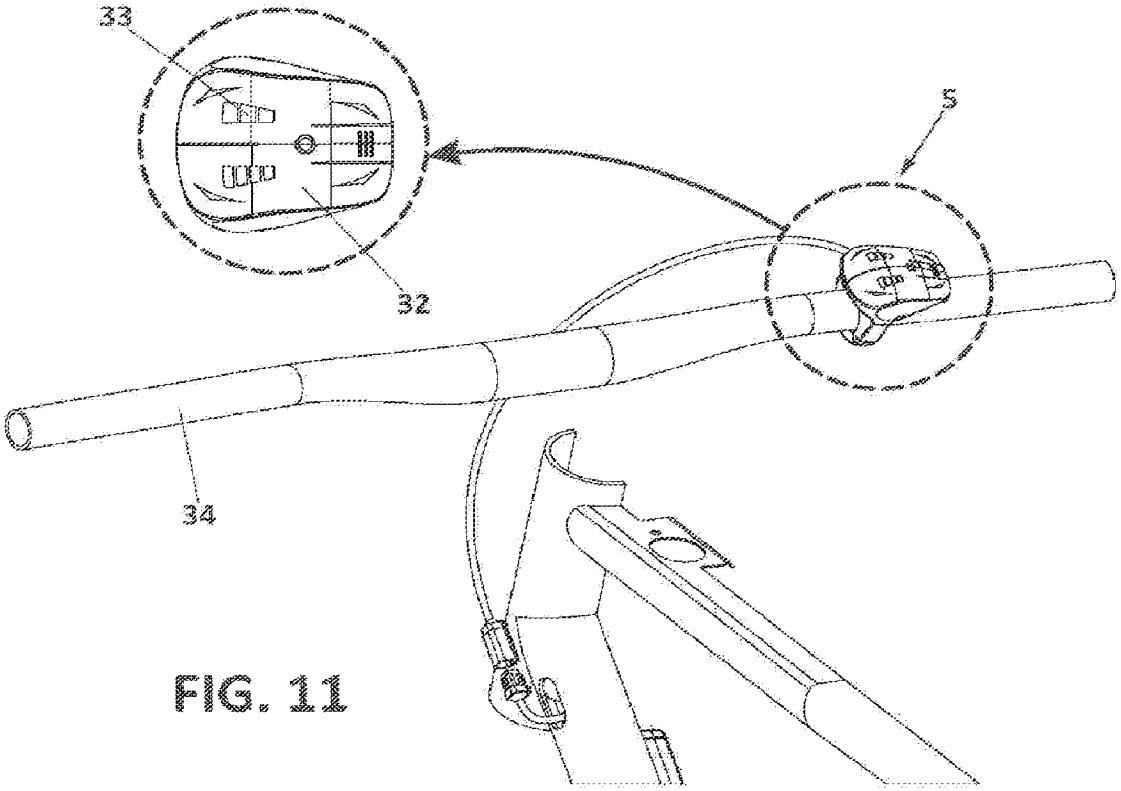
FIG. 11 is a detailed view of the control unit according to a third preferred embodiment.

FIG. 11 shows a control unit (5) according to a third preferred embodiment that includes a five-button pushbutton (32) coupled to the handlebar (34).

The invention claimed is:

1. An electric motor device for pedal assist bicycles, comprising:

an electric motor having a hub shape, the electric motor connectable to a rim of a rear wheel of a bicycle, the electric motor including at least one free wheel rigidly connectable to at least one transmission gear wheel of the bicycle;

a pedaling sensor connectable to a hanger of a frame of the bicycle[, the hanger disposed in an anchoring zone of a rear hub of the frame of the bicycle];

a charging outlet;

a control unit[connectable to the frame of the bicycle and] operable via a user for actuation and control;

a block insertable into an oblique main tube of[the] *a* frame of the bicycle;

wherein the block includes:

a battery operatively connected to the charging outlet such that the battery is rechargeable via the charging outlet, the battery configured to actuate the electric motor;

a motor controller connected[in parallel] to the battery, the motor controller configured to control a plurality of operating parameters of the electric motor;

a battery manager connected[in parallel] to the battery and to the motor controller, the battery manager configured to manage the battery;

a plurality of first cables connecting the block to the electric motor, the charging outlet, and the pedaling sensor;

a plurality of second cables connecting the block to *at least* the control unit;

a first cover closing a first axial end of the block, the plurality of first cables extending out of the block through the first cover; and a second cover closing a second axial end of the block, the plurality of second cables extending out of the block through the second cover;

wherein the battery manager and the motor controller are directly connected to one another in parallel.

2. The electric motor device as claimed in claim 1, wherein the pedaling sensor includes:

a disk rigidly connectable to the at least one free wheel of the electric motor; and a plurality of magnets arranged on the disk configured to activate the pedaling sensor.

3. The electric motor device as claimed in claim 1, wherein the control unit includes:

a pushbutton with at least one button actuatable via the user;

a lighting mechanism configured to transmit information via emitting light; and a vibration motor connected to the pushbutton configured to transmit information via providing vibrations.

4. The electric motor device as claimed in claim 3, wherein the vibration motor includes a variable-frequency drive configured to transmit information via providing a plurality of different vibrations.

5. The electric motor device as claimed in claim 1, wherein:

the battery includes a block of cells; and the block of cells includes a group of ten cells and an auxiliary cell structured and arranged in an 11S2P layout.

6. The electric motor device as claimed in claim 1, wherein:

the battery includes a block of cells; and the block of cells includes a group of thirteen cells and an auxiliary cell structured and arranged in a 14S2P layout.

7. The electric motor device as claimed in claim 1, wherein:

the battery includes a block of cells;

the block of cells includes eleven cells connected to one another in series; and the eleven cells includes two groups of cells connected in parallel such that the eleven cells are arranged in an 11S2P layout.

8. The electric motor device as claimed in claim 1, wherein:

the battery includes a block of cells;

the block of cells includes fourteen cells connected to one another in series; and the fourteen cells includes two groups of cells connected in parallel such that the fourteen cells are arranged in an 14S2P layout.

9. The electric motor device as claimed in claim 1, wherein:

the battery includes a block of cells;

the block of cells includes a plurality of groups of cells;

each of the plurality of groups of cells includes at least one of ten cells and thirteen cells; and the block of cells further includes one auxiliary cell for each group of the plurality of groups of cells.

10. The electric motor device as claimed in claim 1, wherein:

the battery, the battery manager, and the motor controller are directly connected to one another in parallel; and a circuit board of the battery manager is connected directly to a circuit board of the motor controller.

11. The electric motor device as claimed in claim 1, wherein a direct connection between the battery manager and the motor controller is free of cables.

12. The electric motor device as claimed in claim 1, further comprising an auxiliary battery that is operatively connectable to the battery and is releasably connectable to the bicycle.

13. The electric motor device as claimed in claim 1, wherein the battery manager and the motor controller are directly connected to one another physically and electrically such that the battery manager and the motor controller are configured as a single unit.

14. An electric motor device for pedal assist bicycles, comprising:

an electric motor having a hub shape, the electric motor connectable to a rim of a rear wheel of a bicycle, the electric motor including at least one free wheel rigidly connectable to at least one transmission gear wheel of the bicycle;

a pedaling sensor[connectable to a hanger of a frame of the bicycle, the hanger disposed in an anchoring zone of a rear hub of the frame of the bicycle];

a charging outlet;

a control unit[connectable to the frame of the bicycle and] operable via a user for actuation and control;

a block insertable into an oblique main tube of[the] *a* frame of the bicycle;

wherein the block includes:

a battery operatively connected to the charging outlet such that the battery is rechargeable via the charging outlet, the battery configured to actuate the electric motor;

a motor controller configured to control a plurality of operating parameters of the electric motor;

a battery manager configured to manage the battery;

the battery manager, the battery, and the motor controller connected directly together[in parallel];

a plurality of first cables connecting the block to the electric motor, the charging outlet, and the pedaling sensor;

a plurality of second cables connecting the block to *at least* the control unit;

a first cover closing a first axial end of the block, the plurality of first cables extending out of the block through the first cover; and a second cover closing a second axial end of the block, the plurality of second cables extending out of the block through the second cover.

15. The electric motor device as claimed in claim 14, wherein:

the block further includes a rubber insulator and a rubber O-ring seal; and the O-ring seal and the insulator are coupled to the block via the first cover and seal the block.

16. The electric motor device as claimed in claim 15, wherein the insulator is overmolded onto the plurality of first cables sealingly connecting the plurality of first cables together.

17. An electric motor device for pedal assist bicycles, comprising:

an electric motor having a hub shape, the electric motor connectable to a rim of a rear wheel of a bicycle, the electric motor including at least one free wheel rigidly connectable to at least one transmission gear wheel of the bicycle;

a pedaling sensor[connectable to a hanger of a frame of the bicycle, the hanger disposed in an anchoring zone of a rear hub of the frame of the bicycle];

a charging outlet;

a control unit[connectable to the frame of the bicycle and] operable via a user for actuation and control;

a block insertable into an oblique main tube of[the] *a* frame of the bicycle;

wherein the block includes:

an outer protective covering[including an upper casing and a lower casing];

a first cover closing a first axial end of the block;

a second cover closing a second axial end of the block;

a battery operatively connected to the charging outlet such that the battery is rechargeable via the charging outlet, the battery configured to actuate the electric motor;

a motor controller connected[in parallel] to the battery, the motor controller configured to control a plurality of operating parameters of the electric motor;

a battery manager connected in parallel to the battery and to the motor controller, the battery manager configured to manage the battery;

a plurality of first cables connecting the block to the electric motor, the charging outlet, and the pedaling sensor, the plurality of first cables extending out of the block through the first cover; and

[a plurality of] *at least one* second cable[s] connecting the block to the control unit, the[plurality of] *at least one* second cable[s] extending out of the block through the second cover.

*18. An electric motor device for pedal assist bicycles, comprising:*

*an electric motor connectable to a rim of a rear wheel of a bicycle, the electric motor including at least one free wheel rigidly connectable to at least one transmission gear wheel of the bicycle;*

*a pedaling sensor;*

*a charging outlet;*

*a user actuatable control unit connectable to a handlebar of the bicycle;*

*a block insertable into a tube of a frame of the bicycle; wherein the block includes:*

*a battery operatively connected to the charging outlet such that the battery is rechargeable via the charging outlet, the battery configured to actuate the electric motor;*

*a motor controller configured to control a plurality of operating parameters of the electric motor;*

*a battery manager configured to manage the battery;*

*the battery manager, the battery, and the motor controller connected directly together;*

*a plurality of first cables connecting the block to the electric motor, the charging outlet, and the pedaling sensor;*

*at least one second cable connecting the block to at least the control unit;*

*a first cover closing a first axial end of the block, the plurality of first cables extending out of the block through the first cover; and*

*a second cover closing a second axial end of the block, the at least one second cable extending out of the block through the second cover.*

*19. The electric motor device as claimed in claim 18, further comprising an auxiliary component, wherein the at least one second cable connects the block to the control unit and to the auxiliary component.*

*20. The electric motor device as claimed in claim 19, wherein the auxiliary component is a light.*

*21. The electric motor device as claimed in claim 19, wherein:*

*the at least one second cable includes a plurality of second cables; and*

*the plurality of second cables includes a cable connecting the block to the control unit and another cable connecting the block to the auxiliary component.*

* * * * *